United States Patent
Kadi et al.

(10) Patent No.: US 10,835,889 B1
(45) Date of Patent: *Nov. 17, 2020

(54) ALCOHOL BASED METHOD OF MAKING MULTI-WALLED CARBON NANOTUBE NANOCOMPOSITE

(71) Applicant: King Abdulaziz University, Jeddah (SA)

(72) Inventors: Mohammad W. Kadi, Jeddah (SA); Reda Mohamedy Mohamed Ouf, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/983,570

(22) Filed: Aug. 3, 2020

Related U.S. Application Data

(63) Continuation of application No. 15/959,956, filed on Apr. 23, 2018, now Pat. No. 10,786,803.

(51) Int. Cl.
| | |
|---|---|
| *B01J 21/18* | (2006.01) |
| *B01J 35/00* | (2006.01) |
| *B01J 35/10* | (2006.01) |
| *B01J 37/02* | (2006.01) |
| *B01J 37/04* | (2006.01) |
| *C01B 3/22* | (2006.01) |
| *B01J 19/12* | (2006.01) |
| *B01J 21/06* | (2006.01) |

(52) U.S. Cl.
CPC ........... *B01J 21/185* (2013.01); *B01J 19/127* (2013.01); *B01J 21/066* (2013.01); *B01J 35/004* (2013.01); *B01J 35/0013* (2013.01); *B01J 35/1014* (2013.01); *B01J 37/0221* (2013.01); *B01J 37/04* (2013.01); *C01B 3/22* (2013.01); *B01J 2219/0877* (2013.01); *B01J 2219/0892* (2013.01); *B01J 2219/1203* (2013.01); *C01B 2203/0277* (2013.01); *C01B 2203/1082* (2013.01); *C01B 2203/1217* (2013.01)

(58) Field of Classification Search
CPC ........ B01J 21/185; B01J 21/066; B01J 19/10; B01J 2219/00486; B01J 37/343; C01B 32/158; C01B 2202/06
USPC .......... 502/182, 349, 174; 423/608; 977/752
See application file for complete search history.

(56) References Cited

U.S. PATENT DOCUMENTS

| | | |
|---|---|---|
| 5,750,459 A | 5/1998 | Marella et al. |
| 8,337,799 B2 | 12/2012 | Bogicevic et al. |
| 8,586,501 B2 | 11/2013 | Lewis et al. |

(Continued)

FOREIGN PATENT DOCUMENTS

| | | |
|---|---|---|
| CN | 101823689 B | 12/2012 |
| CN | 102513086 B | 4/2016 |

OTHER PUBLICATIONS

V.O. Almeida, et al., "Synthesis of zirconia powders with carbon nanotubes by sol-gel method", http://sbpmat.org.br/9encontro/especific_files/papers/C591.pdf, Jun. 1, 2010, 1 page.

(Continued)

*Primary Examiner* — Patricia L. Hailey
(74) *Attorney, Agent, or Firm* — Oblon, McClelland, Maier & Neustadt, L.L.P.

(57) ABSTRACT

A method for the preparation of zirconia-multi-walled carbon nanotube nanocomposite utilizing Pluronics as templating agents is described. An efficient method for producing hydrogen gas using the nanocomposite as a photocatalyst.

4 Claims, 8 Drawing Sheets

(56) References Cited

U.S. PATENT DOCUMENTS

| 8,865,109 B2 | 10/2014 | Steiner, III et al. |
|---|---|---|
| 2006/0024503 A1 | 2/2006 | Wong et al. |
| 2008/0255294 A1 | 10/2008 | Yerushalmi-Rozen |
| 2011/0027162 A1 | 2/2011 | Steiner, III et al. |
| 2012/0077672 A1 | 3/2012 | Chu et al. |
| 2012/0214664 A1 | 8/2012 | Mordkovich et al. |

OTHER PUBLICATIONS

Qiang, Li, et al., "Facile synthesis of highly stable and well-dispersed mesoporous $ZrO_2$/carbon composites with high performance in oxidative dehydrogenation of ethylbenzene", Physical Chemistry Chemical Physics, vol. 12, Issue 36, Jul. 28, 2010, pp. 10996-11003 (Abstract only).

Yan Shan, et al., "Synthesis and characterization of phase controllable $ZrO_2$-carbon nanotube nanocomposites", Nanotechnology, vol. 16, No. 6, Mar. 9, 2005, 2 pages (Abstract only).

Ahmed S. Yasin, et al., "$ZrO_2$ nanofibers/activated carbon composite as a novel and effective electrode material for the enhancement of capacitive deionization performance", RSC Advances, vol. 7, 2017, pp. 4616-4626.

G. Gonzalez, et al., "Nanocomposite building blocks of $TiO_2$-$MWCNT_f$ and $ZRO_2$-$MWCNT_f$", Materials Characterization, vol. 64, 2012, pp. 96-106.

Voltaire O. Almeida, et al., "Enhanced mechanical properties in $ZrO_2$ multi-walled carbon nanotube nanocomposites produced by sol-gel and high pressure", Nano-Structures & Nano-Objects, vol. 4, 2015, pp. 1-8.

V. O. Almeida, et al., "Surfactants for CNTs dispersion in zirconia-based ceramic matrix by sol-gel method", J. Sol-Gel Sci Technol, vol. 65, 2013, pp. 143-149.

Annamária Duszová, et al., "Zirconia/carbon nanofiber composite", Scripta Materialia, vol. 58, 2008, pp. 520-523.

T.Y. Luo, et al., "Stabilization of cubic zirconia by carbon nanotubes", Materials Science and Engineering: A, vol. 366, 2004, pp. 206-209.

T.Y. Luo, et al., "Addition of carbon nanotubes during the preparation of zirconia nanoparticles: influence on structure and phase composition", Powder Technology, vol. 139, 2004, pp. 118-122.

ALCOHOL BASED METHOD OF MAKING MULTI-WALLED CARBON NANOTUBE NANOCOMPOSITE

CROSS-REFERENCE TO RELATED APPLICATIONS

The present application is a Continuation of Ser. No. 15/959,956, pending, having a filing date of Apr. 23, 2018.

BACKGROUND OF THE INVENTION

Technical Field

The present invention relates to zirconia-multi-walled carbon nanocomposite, a method of manufacturing a zirconia multi walled carbon nanotube (MWCNT) composite and the use of a zirconia-multi-walled carbon nanocomposite as a photocatalyst for the production hydrogen from water.

Description of the Related Art

Zirconia ($ZrO_2$) has long been used in many applications. It has favorable mechanical properties such as toughness, hardness, impact strength and ionic properties, and is utilized in many applications such as structural reinforcements, dental implants, and sensors. The catalytic activity of zirconia has been utilized in numerous reactions [Srinivasan et al. "Zirconia: a review of a super ceramic", in: D. L. Perry (Ed.), Materials Synthesis and Characterization, Springer, US, 1997, pp. 147-188; and Almeida et al. "Enhanced mechanical properties in $ZrO_2$ multi-walled carbon nanotube nanocomposites produced by sol-gel and high-pressure" Nano-Structures & Nano-Objects, 4 (2015) 1-8]. With the advancement of nanomaterial synthesis, new approaches for the synthesis of zirconia based materials enabled tailoring the material for a specific purpose by enhancing certain desired properties. For example, Almeida et al. used the sol-gel approach to enhance the mechanical properties of $ZrO_2$-multi-walled carbon nanotube nanocomposite. Amin et al. ["Electrocatalytic activity of $PteZrO_2$ supported on different carbon materials for methanol oxidation in $H_2SO_4$ solution" International Journal of Hydrogen Energy 41 (2016) 1846-1858] describe the synthesis and electrolytic properties of Pt—$ZrO_2$/MWCNTs and other compounds for methanol oxidation in sulfuric acid solution by a solid state reaction method utilizing intermittent microwave heating. Malolepszy et al. ["Deactivation resistant $PdZrO_2$ supported on multiwall carbon nanotubes catalyst for direct formic acid fuel cells" International Journal of Hydrogen Energy 40 (2015) 16724-16733] utilized a microwave assisted hydrothermal method for the synthesis of Pd—$ZrO_2$/MWCNT and used it to construct a formic acid fuel cell. Another fuel cell was built using a Pt catalyst supported on sulfated MWCNT-$ZrO_2$. In the preparation of the nanocomposite, ammonia and sulfuric acid were used as precipitating and sulfating agents, respectively [Dao-Jun et al. "Synthesis of sulfated $ZrO_2$/MWCNT composites as new supports of Pt catalysts for direct methanol fuel cell application" Applied Catalysis B: Environmental 89 (2009) 597-601]. Michalek et al. [Mechanical and functional properties of $Al_2O_3$—$ZrO_2$-MWCNTs nanocomposites, Journal of the European Ceramic Society 34 (2014) 3329-3337] describes the mechanical and functional properties of $Al_2O_3$—$ZrO_2$-MW-CNT nanocomposites synthesized by a method that included the use of liquid nitrogen and freeze drying. A cobalt doped $ZrO_2$ decorated multi-walled carbon nanotube catalyst was synthesized via a homogenous co-precipitation process and was utilized for the photo-degradation of indigo, carmine, and eosin Y dyes [Anku et al. "Cobalt doped $ZrO_2$ decorated multi-walled carbon nanotube: A promising nanocatalyst for photo-degradation of indigo carmine and eosin Y dyes" Progress in Natural Science: Materials International 26 (2016) 354-361]. Anku et al. describes the synthesis of palladium-doped-$ZrO_2$-MWCNTs nanocomposite employing a homogenous co-precipitation method and used the nanocomposite in water treatment [Palladium-doped-$ZrO_2$-multiwalled carbon nanotubes nanocomposite: an advanced photocatalyst for water treatment, Appl. Phys. A (2016) 122:579]. Wang et al. [Fabrication and characterization of a zirconia/multi-walled carbon nanotube mesoporous composite, Materials Science and Engineering C 33 (2013) 3931-3934] reported the synthesis of a mesoporous MWCNT-$ZrO_2$ nanocomposite via a hydrothermal method and the use of the cationic surfactant cetyltrimethylammonium bromide. Liu et al. [Controlling the Particle Size of $ZrO_2$ Nanoparticles in Hydrothermally Stable $ZrO_2$/MWCNT Composites, Langmuir 2012, 28, 17159-17167] describes a method of controlling particles size of $ZrO_2$ in a composite of MWCNTs decorated with $ZrO_2$ nanoparticles by a grafting method followed by high-temperature annealing.

The present disclosure describes the synthesis of a $ZrO_2$-multi-walled carbon nanotube nanocomposite (MWCNT-$ZrO_2$) using a templating agent. The method may be carried out using available laboratory equipment. The nanocomposite produced by the method is an efficient photocatalyst and can be utilized in a method for the production of hydrogen.

BRIEF SUMMARY OF THE INVENTION

According to a first aspect of the invention, the current disclosure relates to a method of making a $ZrO_2$-multi-walled carbon nanotube nanocomposite (MWCNT-$ZrO_2$), comprising:
  dispersing zirconium alkoxide and a templating agent in an alcohol to form a mixture, wherein the ratio of the zirconium alkoxide to the alcohol to the templating agent is in the range of 0.2:10:0.1 to 3:10:0.5,
  stirring the mixture at a temperature in the range of 40–80° C.,
  mixing MWCNT with the mixture, and
  mixing an aqueous carboxylic acid solution with the MWCNT-containing mixture to precipitate the multi-walled carbon nanotube-$ZrO_2$ nanocomposite.

In a preferred embodiment of the method, the templating agent is a non-ionic surfactant, preferably a poloxamer such as but not limited to Pluronic F-127, Pluronic P-123, Pluronic F-108, and Pluronic F-68. In a more preferred embodiment, the templating agent is Pluronic F127.

In another preferred embodiment, the zirconium alkoxide is zirconium methoxide, zirconium ethoxide, zirconium propoxide, zirconium isopropoxide, zirconium butoxide, zirconium isobutoxide, and zirconium t-butoxide. In a preferred embodiment, the zirconium alkoxide is zirconium isopropoxide.

In another preferred embodiment, the solvent is an alcohol, preferably methyl alcohol, ethyl alcohol, propyl alcohol, isobutyl alcohol, butyl alcohol, isobutyl alcohol, and t-butyl alcohol, and most preferably isopropyl alcohol.

In another preferred embodiment, the ratio of zirconium alkoxide to solvent to the templating agent is in the range of 0.2:10:0.1 to 3:10:0.5, preferably 0.5:10:0.2 to 1.5:10:0.4, more preferably 0.8:10:0:25. In the most preferred embodiment of the method, the ratio is 1:10:0.3.

In another embodiment, the produced MWCNT-ZO$_2$ nanoparticle comprises MWCNT in the range 0.5%-8% by weight, preferably 0.7%-7% by weight of MWCNT, more preferably 0.8%-6% by weight of MWCNT, and even more preferably 1.0%-5.0% by weight of MWCNT. In the most preferred embodiment of the method, the produced MWCNT-ZO$_2$ nanoparticle comprises 3% by weight of MWCNT.

Any acid may be used to precipitate the nanoparticles in any of the mentioned embodiments of the method. The preferred acid is a carboxylic acid such as acetic acid, propionic acid, butyric acid, oxalic acid, succinic acid, citric acid, and tartaric acid. In the most preferred embodiment of the method, acetic acid may be used.

In another preferred embodiment, the mixture is stirred at a temperature in the range of 20–80° C., preferably 30-70° C., more preferably, 40-65° C., and most preferably 50-60° C.

In some embodiments, the MWCNT-ZrO$_2$ is filtered and dried under vacuum at about 60° C.

In some other preferred embodiment, the dried MWCNT-ZrO$_2$ is calcined of at about 300° C. under nitrogen.

A second aspect of the invention is related to a MWCNT-ZrO$_2$ nanocomposite, preferably prepared by the method described herein.

A preferred embodiment of the nanocomposite contains about 0.5-8% MWCNT by weight of MWCNT, preferably 0.7%-7%, more preferably 0.8%-6% by weight of MWCNT, and even more preferably 1.0%-5.0% by weight of MWCNT. In the most preferred embodiment of the method, the produced ZO$_2$-MWCNT nanoparticle comprises 3% by weight of MWCNT.

In another preferred embodiment, the nanocomposite has a surface area in the range of 53.5±2 to 59.5±2 m$^2$/g. A more preferred embodiment of the method, the nanocomposite has a surface area in the range of 56.5±1 to 59.5±1 m$^2$/g. The most preferred embodiment, the nanocomposite has a surface area of 59.2±0.6 m$^2$/g.

In another preferred embodiment, the nanocomposite is a photocatalyst having band gap energy in the range 3.33 to 2.63 eV. In a more preferred embodiment, the band gap is 2.67±0.05.

In another preferred embodiment, the nanocomposite contains MWCNT in an amount selected from the group consisting of 1 wt. %, 2 wt. %, 3 wt. %, 4 wt. %, and 5 wt. %. In the most preferred embodiment, the nanocomposite contains 3 wt. % MWCNT.

A third aspect of the invention is directed to a photochemical method for the production of hydrogen from water, the method comprising irradiating a reaction mixture comprising an aqueous solution and a photocatalyst comprising the MWCNT-ZrO$_2$ nanocomposite with light to form hydrogen gas.

In a preferred embodiment, the photocatalyst is selected from the group consisting of 2 wt. % MWCNT-ZrO$_2$, 3 wt. % MWCNT-ZrO$_2$, 4 wt. % MWCNT-ZrO$_2$, and 5 wt. % MWCNT-ZrO$_2$.

In another preferred embodiment, the reaction mixture contains about 0.5-4.0 g/L photocatalyst, more preferably 1.0-3.0 g/L, and most preferably, 1.5-2.5 g/L.

In another preferred embodiment, the reaction mixture contains about 2.0±0.2 g/L of the photocatalyst.

In another preferred embodiment, reaction mixture comprises an alcohol wherein the alcohol is selected from the group consisting of methanol, ethanol, propanol, isopropanol, butanol, isobutanol, and t-butanol.

In a preferred embodiment, the reaction mixture contains alcohol in the range 2%-20%, preferably, 5%-15%, more preferably 8%-12%, and most preferably 9%-11%.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
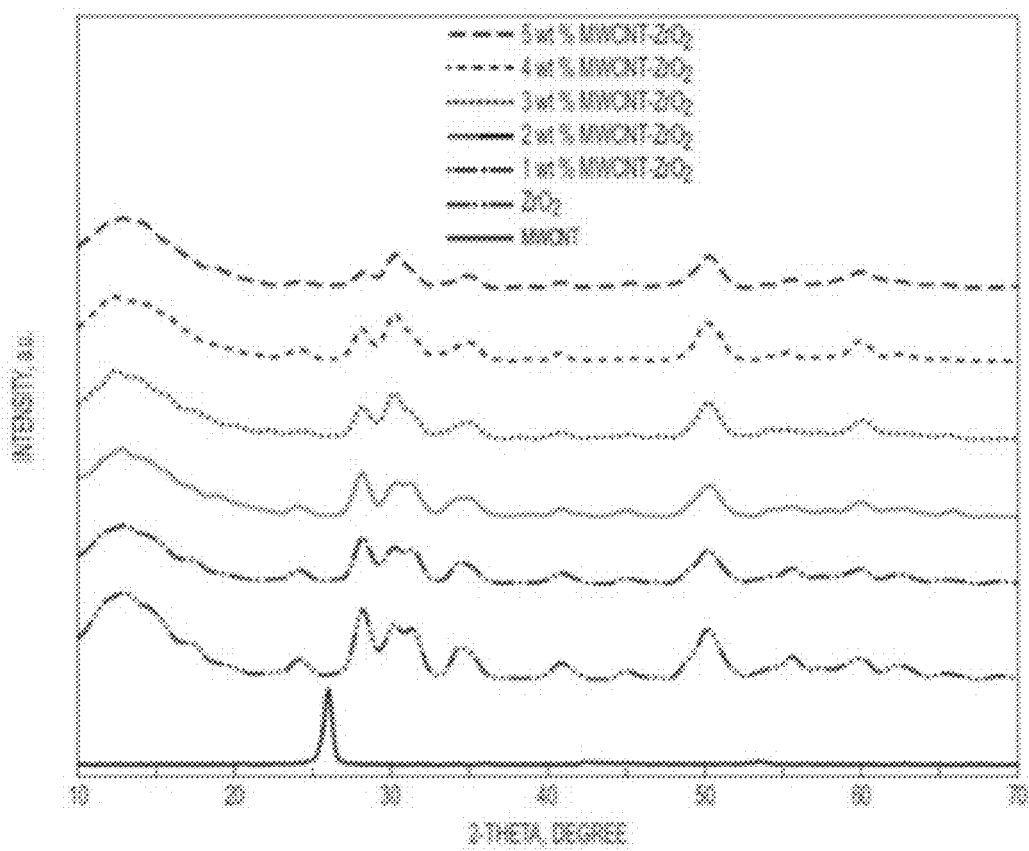
FIG. 1 XRD patterns of MWCNT, ZrO$_2$, and MWCNT-ZrO$_2$ nanocomposite having 1, 2, 3, 4, and 5 wt. % of MWCNT.

Embodiments of the present disclosure will now be described more fully hereinafter with reference to the accompanying drawings, in which some, but not all embodiments of the disclosure are shown. The present disclosure will be better understood with reference to the following definitions.

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

As used herein, the terms "compound" is intended to refer to a chemical entity, whether in a solid, liquid or gaseous phase, and whether in a crude mixture or purified and isolated.

As used herein, the term "alkyl" unless otherwise specified refers to both branched and straight chain saturated aliphatic primary, secondary, and/or tertiary hydrocarbons of typically $C_1$ to $C_{10}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. As used herein, the term optionally includes substituted alkyl groups. Exemplary moieties with which the alkyl group can be substituted may be selected from the group including, but not limited to, hydroxyl, alkoxy, aryloxy, or combination thereof.

As used herein, the term "alcohol" unless otherwise specified refers to a chemical compound having an alkyl group bonded to a hydroxyl group. Many alcohols are known in the art including, but not limited to, methanol, ethanol, propanol, isopropanol, butanol, isobutanol and t-butanol, as well as pentanol, hexanol, heptanol and isomers thereof. Since the alkyl group may be substituted with one or more hydroxyl group, the term "alcohol" includes diols, triol, and sugar alcohols such as, but not limited to, ethylene glycol, propylene glycol, glycerol, and polyol.

As used herein, the term "about" refers to an approximate number within 20% of a stated value, preferably within 15% of a stated value, more preferably within 10% of a stated value, and most preferably within 5% of a stated value. For example, if a stated value is about 8.0, the value may vary in the range of 8±1.6, ±1.0, ±0.8, ±0.5, ±0.4, ±0.3, ±0.2, or ±0.1.

The present disclosure is further intended to include all isotopes of atoms occurring in the present compounds. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of zirconium include $^{90}Zr$, $^{91}Zr$, $^{92}Zr$, $^{93}Zr$, $^{94}Zr$, and $^{96}Zr$. Isotopes of oxygen include $^{16}O$, $^{17}O$, and $^{18}O$. Isotopically labeled compounds of the invention can generally be prepared by conventional techniques known to those skilled in the art or by processes and methods analogous to those described herein, using an appropriate isotopically labeled reagent in place of the non-labeled reagent otherwise employed.

As used herein a "polymer" or "polymeric resin" refers to a large molecule or macromolecule, of many repeating subunits and/or substances composed of macromolecules. As used herein a "monomer" refers to a molecule or compound that may bind chemically to other molecules to form a polymer. As used herein the term "repeat unit" or "repeating unit" refers to a part of the polymer or resin whose repetition would produce the complete polymer chain (excluding the end groups) by linking the repeating units together successively along the chain. The process by which monomers combine end to end to form a polymer is referred to herein as "polymerization" or "polycondensation", monomers are molecules which can undergo polymerization, thereby contributing constitutional repeating units to the structures of a macromolecule or polymer. As used herein "resin" or "polymeric resin" refers to a solid or highly viscous substance or polymeric macromolecule containing polymers, preferably with reactive groups. As used herein a "copolymer" refers to a polymer derived from more than one species of monomer and are obtained by "copolymerization" of more than one species of monomer. Copolymers obtained by copolymerization of two monomer species may be termed bipolymers, those obtained from three monomers may be termed terpolymers and those obtained from four monomers may be termed quarterpolymers, etc. As used herein, "cross-linking", "cross-linked" or a "cross-link" refers to polymers and resins containing branches that connect polymer chains via bonds that link one polymer chain to another. The cross-link may be an atom, a group of atoms, or a number of branch points connected by bonds, groups of atoms, or polymer chains. In the majority of cases, a cross-link is a covalent structure or covalent bond but the term may also describe sites of weaker chemical interactions, portion crystallites, and even physical interactions and entanglements. The cross-linking can alter the physical and mechanical properties of the polymer. Cross-linking may be formed by chemical reactions that are initiated by heat, pressure, change in pH, and/or radiation, with or without the presence of a cross-linking agent and/or catalyst. In certain embodiments, at least one diaminoalkane or di-dithiocarbamate alkane functions as a cross-linking agent for the cross-linked polymeric resin described herein. In a preferred embodiment, the diaminoalkane or di-dithiocarbamate chains function as cross-linking agents or monomers can be add to the polymer or a polymerization reaction to modify to increase the cross-linking of the polymer.

As used herein, the term "template" refers to as a structure directing agent and is stable under hydrothermal aging conditions and furthermore hydrophobic relative to the metal salts. Many templates used in the manufacturing nanoparticles are known in the art. They include all types of surfactants including anionic surfactants, cationic surfactants, and neutral surfactants as well as polymers with surfactant properties such as Poloxamer. The surfactant may act as a nucleation site for the formation of the nanoparticles. Alkyl ammonium salts are commonly used as templates to form structures in solution that interacts with the inorganic material in solution and serve as a template for the growth of nanoparticles. A commonly used template is tetrapropylammonium hydroxide, tetraethylammonium hydroxide, tetrabutylammonium hydroxide, or tetrapentylammonium hydroxide. Other known templates include cetyl trimethylammonium bromide, cetyl triethylammonium bromide, dodecyl triethylammonium bromide, Brij-56, or Brij-30. The template is usually decomposed during calcining at temperatures in the range 545-600° C. for 6-10 hours.

In this disclosure, the terms "poloxamer" and "Pluronic" have the same meaning and are used interchangeably. Poloxamers or Pluronics are nonionic triblock copolymers composed of a central hydrophobic block of polypropylene glycol flanked by two hydrophilic blocks of polyethylene glycol (PEG) having the formula:

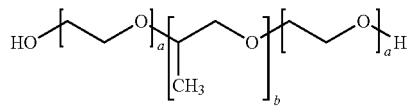

wherein "a" is any value in the range 2-130 and "b" is any value in the range 15 and 67. Poloxamers are also known by their trade name Synperonics™, Pluronics™ and Kolliphor™. Because the lengths of the polymer blocks may be customized, many different poloxamers exist having slightly different properties. For the generic term "poloxamer", these copolymers are commonly named with the letter "P" (for poloxamer) followed by three digits: the first two digits multiplied by IN give the approximate molecular mass of the polyoxypropylene core, and the last digit multiplied by 10 gives the percentage polyoxyethylene content, e.g. P407=poloxamer with a polyoxypropylene molecular mass of 4,000 g/mole and a 70% polyoxyethylene content. For the Pluronic and Synperonic tradenames, coding of these copolymers starts with a letter to define its physical form at room temperature (L=liquid, P=paste, F=flake (solid)) followed by two or three digits, The first digit (two digits in a three-digit number) in the numerical designation, multiplied by 300, indicates the approximate molecular weight of the hydrophobe; and the last digit×10 gives the percentage polyoxyethylene content (e.g., L61 indicates a polyoxypropylene molecular mass of 1,800 g/mol and a 10% polyoxyethylene content). In the example given, poloxamer 181 (P181)=Pluronic L61 and Synperonic PE/L 61. Pluronic F127, also known as poloxamer 407, is a hydrophilic non-ionic surfactant wherein "a" and "b" are approximately block length of 101 and 56, respectively. Pluronic P123 has the same chemical formula as that of Pluronic F127 except that a=20 and b=70. Many commercially available Pluronics including but not limited to are Pluronic P108, Pluronic P103, Pluronic P104, and Pluronic P105.

Multi-walled carbon nanotubes (MWCNT) consist of multiple concentric rolled layers of graphene tubes. There are two models that can be used to describe the structures of MWCNT. In the Russian Doll model, sheets of graphite are arranged in concentric cylinders, for example, a single-walled nanotube within a larger single-walled nanotube. In the Parchment model, a single sheet of graphite is rolled in around itself, resembling a scroll of parchment or a rolled newspaper. The interlayer distance in MWCNT is close to the distance between graphene layers in graphite of approximately 3.4 Å. The Russian Doll structure is observed more commonly.

A first aspect of the invention is directed to a method of preparing MWCNT-$ZrO_2$ nanocomposite. The method comprises preparing a mixture by suspending a zirconium alkoxide and MWCNT in an alcohol containing a templating agent and sonicating. While agitating and heating the mixture, a solution in the range of 1%-10%, preferably 1%-6%, more preferably 1%-4% and most preferably 2%-3% acetic acid in water is added dropwise until a precipitate is formed. The mixture may be heated at a temperature in the range 40-80° C., preferably in the range 50-70° C., and more preferably in the range 55-60° C.

Any zirconium alkoxide may be utilized in the method including but not limited to zirconium methoxide, zirconium ethoxide, zirconium propoxide, zirconium isopropoxide, zirconium butoxide, zirconium isobutoxide, and zirconium t-butoxide. Similarly, any solvent or combination of solvents may be used in the method. In some embodiment, the solvent is miscible with water including but not limited to acetonitrile, dimethyl sulfoxide, dimethyl-formamide, and alcohols with alkyl group having 1-6 carbon atoms. In some more preferred embodiments, the solvent is an alcohol including methanol, ethanol, propanol, isopropanol, butanol, isobutanol, and t-butanol as well as pentanol and hexanol and isomers thereof. In the most preferred embodiment, the alcohol is methanol, ethanol, propanol, and/or isopropanol. In some other preferred embodiments, the alcohol and zirconium alkoxide have the same alkyl group. For example, zirconium isopropoxide and isopropanol are used together.

The precipitate may be separated from the mixture by filtration, decantation, or centrifugation and washed several times with water and low boiling point alcohols such as methanol or ethanol. The resulting powder may be dried in vacuum at a temperature in the range 50-90° C., preferably in the range of 55-75° C., more preferably in the range of 60-70° C. Following the drying, the powder may be calcined at a temperature in the range of 200-700° C., more preferably in the range of 250-600° C., and most preferably in the range of 300-500° C.

A second aspect of the invention is the MWCNT-$ZrO_2$ nanocomposite prepared by the method described herein.

In some embodiments, the MWCNT-$ZrO_2$ nanocomposite contains MWCNT of the invention in the range from 0.1 wt. % to 8.0 wt. %, preferably 0.5 wt. % to 6.0 wt. %, more preferably 1.0 wt. % to 5.0 wt. %, and most preferably 2.0 wt. % to 3 wt. % relative to the total weight of the MWCNT-$ZrO_2$ nanocomposite. In particular preferred embodiment, the MWCNT-$ZrO_2$ nanocomposite contains MWCNT in an amount selected from the group consisting of 1%, 2%, 3%, and 5% relative to the total weight of the MWCNT-$ZrO_2$ nanocomposite.

In some embodiments, the MWCNT-$ZrO_2$ nanocomposite of the invention may have a surface area is in the range of $51.0 \pm 2$ to $65.0 \pm 2$ $m^2/g$, more preferably the surface area is in the range of $53.0 \pm 2$ to $60.0 \pm 2$ $m^2/g$, and most preferably $54.0 \pm 2$ to $58.0 \pm 2$ $m^2/g$. In a particular preferred embodiment of the invention, the surface area is $59.2 \pm 2$ $m^2/g$.

Another preferred embodiment, the MWCNT-$ZrO_2$ nanocomposite of the invention is a photocatalyst with a band gap ranging from 3.35 eV to 2.50 eV, preferably ranging from 3.0 eV to 2.60 eV, more preferably ranging from 2.80 eV to 2.60 eV. In particularly preferred embodiment, the MWCNT-$ZrO_2$ nanocomposite has a band gap selected from the group consisting of about 2.81 eV, 2.70 eV, 2.69 eV, and 2.66 eV.

A third aspect of the invention is related to a photochemical method of producing hydrogen gas from water. The method comprises suspending MWCNT-$ZrO_2$ nanocomposite in alcohol aqueous solution to form a composition and irradiating the composition with light source and collecting the evolved hydrogen. The light source may be any light source including, but not limited to a lamp such as tungsten lamp, xenon lamp or fluorescent lamp, or sun light. The method may require dissipating the heat produced by the lamp or the sun. Thus, the method may utilize a cooling system such as circulating water bath and the like or adding ice.

Any water miscible alcohol such as but not limited to methanol, ethanol, propanol, and isopropanol may be used. The amount of alcohol in the aqueous solution may be in the range of 1% to 30% (v/v), preferably in the range of 5% to 20% (v/v), more preferably in the range of 8% to 15% (v/v), most preferably in the range of 9% to 12% (v/v). In a particular preferred embodiment, the amount of alcohol is 10% (v/v). The water used in the method may be treated or untreated sea water, river water, or underground water. It may be filtered to remove solid materials such as sand, clay, and other solids or biological materials.

In a preferred embodiment of the method, the amount of photocatalyst present in the aqueous solution is in the range from 0.5 g/L to 3.0 g/L, more preferably in the range of 1.0 g/L to 2.5 g/L, and most preferably in the range of 1.5 g/L to 2.5 g/L. In a particularly preferred embodiment, the amount of photocatalyst added to the aqueous solution is 2.0 g/L. The photocatalyst is stable and may be recycled as long as it displays catalytic activity of at least 50%, preferably at least 70%, more preferably at least 80%, and most preferably at least 90% of the catalytic activity observed in the first use. In a preferred embodiment, the photo catalyst may be recycled in the range 2 to 10 times, more preferably in the range 3-500, and most preferably in the range 500-10,000.

Any of the MWCNT-$ZrO_2$ nanocomposites of the invention may be utilized in a method to produce hydrogen. In a preferred embodiment of the method, the photocatalyst comprises MWCNT in an amount of 1%, 2%, 3%, 4%, and 5% relative to the total weight of the MWCNT-$ZrO_2$ nanocomposite.

The examples below are intended to further illustrate protocols for the preparation and characteristics of the MWCNT-ZrO$_2$ nanocomposite described above, and are not intended to limit the scope of the claims.

Example 1

Materials and Methods:

Transmission electron microscopy (TEM) of suspension of nanocomposite in methanol of the nanocomposites was carried out by JEOL-JEM-1230. A Nova 2000 series Chromatech was used to observe the surface area of the composite from N$_2$-adsorption desorption measurements. Crystalline phase of the composites was determined by Bruker axis D8 with Cu K$\alpha$ radiation ($\lambda$=1.540 Å) at room temperature. The band gap was calculated from diffuse reflectance spectra (UV-Vis-DRS). Photoluminescence emission spectra (PL) were recorded on a Shimadzu RF-5301 fluorescence spectrophotometer. Transient photocurrent was recorded by electrochemical workstation, Zahner Zennium, Germany.

Example 2

Preparation of ZrO$_2$ Nanoparticles:

Solution A was prepared by dispersing zirconium isopropoxide in isopropyl alcohol and Pluronic F127 for 1 h using ultrasonic cleaner bath. The ratio of zirconium isopropoxide to isopropyl alcohol to Pluronic F127 was kept at 1:10:0.3. Solution B was prepared by adding 100 ml of deionized water to 2 ml of acetic acid. Solution B was added dropwise to solution A while stirring for 1 h at 333° K until a precipitate is formed. The obtained powder was separated by filtration, washed several times with deionized water and ethanol, and dried under vacuum at 333° K for 10 h. Finally, the powder was calcined for 3 h under nitrogen gas at 573 K.

Example 3

Preparation of MWCNT-ZrO$_2$ Nanocomposites:

In a ratio of 1:10:0.3 (w/w/w), zirconium isopropoxide was dispersed in isopropyl alcohol and Pluronic F127 for 1 h using ultrasonic cleaner bath. For 1% preparation, 0.24 g of MWCNTs was added to 100 mL of the dispersion and sonicated for another 3 h to form solution A. Solution B was prepared by adding 100 ml of deionized water to 2 ml of acetic acid. Solution B was added dropwise to solution A while stirring for 1 h at 333° K (30° C.) until a precipitate was formed. The precipitate was separated by filtration, washed several times with deionized water, and ethanol, and dried under vacuum at 333° K (30° C.) for 10 h. Finally, the powder was calcined for 3 h under nitrogen gas at 573° K (60° C.). The same method was used to prepare 2 wt. % MWCNT-ZrO$_2$, 3 wt. % MWCNT-ZrO$_2$, 4 wt. % MWCNT-ZrO$_2$ and 5 wt. % MWCNT-ZrO$_2$ by using the appropriate amount of MWCT.

Example 4

Hydrogen Production Application:

Hydrogen production experiments were carried out using ZrO$_2$, 1, 2, 3, 4, and 5 wt. % MWCNT-ZrO$_2$ nanocomposites. In a typical experiment, 2 g/L of catalyst was added to 450 mL aqueous solution (10 vol. % methanol). The reaction system was equipped with quartz cooler to dissipate the heat generated by the 500 W Xenon lamp. The lamp irradiated the reaction mixture while stirring and the evolved hydrogen produced was quantified by Agilent GC 7890A system. Also, control experiments containing the reaction mixture without the photocatalyst were carried out.

Example 5

Characterizations of the Nanoparticles:

The XRD patterns of MWCNT, ZrO$_2$, and MWCNT-ZrO$_2$ containing 1-5% MWCNT are shown in FIG. 1. The patterns display pure ZrO$_2$ phase in all six samples without peaks of MWCNT due to the low content of MWCNT in the nanocomposites. Noticeable intensity decrease of ZrO$_2$ is observed as the wt. % of MWCNT increases indicating a decrease of crystallite sizes of ZrO$_2$ nanoparticles.

Figure 2A:
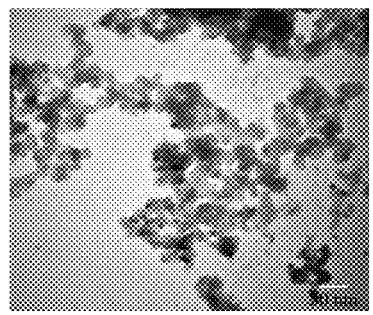
FIG. 2A TEM image of ZrO$_2$.
Figure 2B:
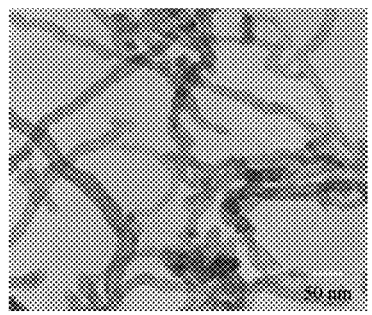
FIG. 2B TEM image of MWCNT.
Figure 2C:
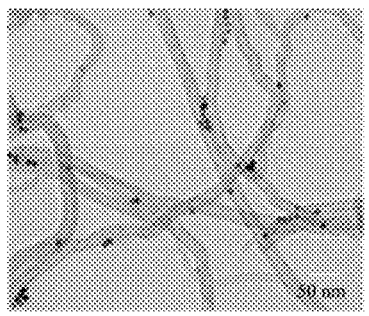
FIG. 2C TEM image of 1 wt. % MWCNT-ZrO$_2$.
Figure 2D:
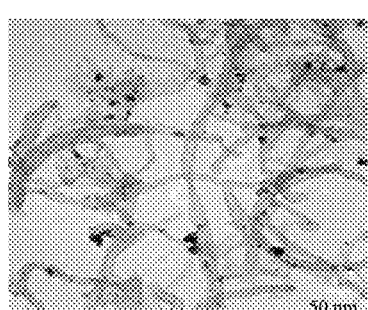
FIG. 2D TEM image of 2 wt. % MWCNT-ZrO$_2$.
Figure 2E:
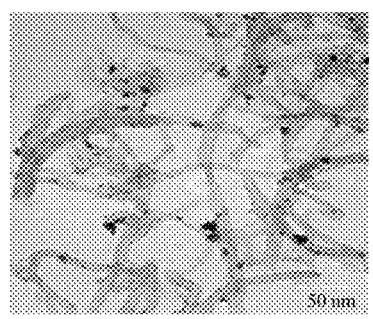
FIG. 2E TEM image of 3 wt. % MWCNT-ZrO$_2$.
Figure 2F:
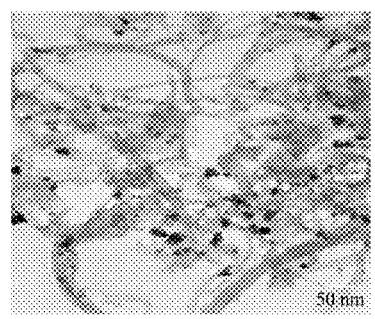
FIG. 2F TEM image of 4 wt. % MWCNT-ZrO$_2$.
Figure 2G:
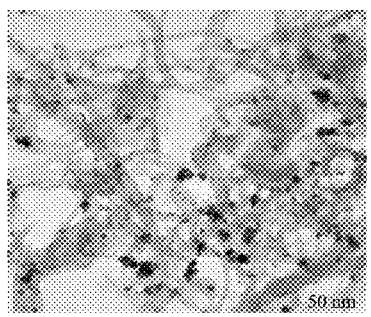
FIG. 2G TEM image of 5 wt. % MWCNT-ZrO$_2$.

The morphology of ZrO$_2$, MWCNT, 1 wt. % MWCNT-ZrO$_2$, 2 wt. % MWCNT-ZrO$_2$, 3 wt. % MWCNT-ZrO$_2$, 4 wt. % MWCNT-ZrO$_2$ and 5 wt. % MWCNT-ZrO$_2$ is examined by TEM. FIG. 2 shows TEM images of MWCNT, ZrO$_2$, and MWCNT-ZrO$_2$ containing 1 wt. %-5 wt. %. The particle size of ZrO$_2$ is small and uniform as shown in FIG. 2(A). The diameter of pure MWCNT is about 20 nm as shown in FIG. 2 B. Also, a uniform cover of MWCNT by ZrO$_2$ is observed as shown in FIG. 2 (C to E). Increase of the weight percent of MWCNT above 3 wt. % leads to agglomeration of ZrO$_2$ as shown in FIG. 2 (F and G).

BET surface area values of ZrO$_2$, MWCNT, 1 wt. % MWCNT-ZrO$_2$, 2 wt. % MWCNT-ZrO$_2$, 3 wt. % MWCNT-ZrO$_2$, 4 wt. % MWCNT-ZrO$_2$ and 5 wt. % MWCNT-ZrO$_2$ samples are shown in Table 1. The increase of the amount of MWCNT from 0 to 3 wt. % improves the BET surface area of ZrO$_2$ from 50 m$^2$/g to 59.2 m$^2$/g. Above 3 wt. %, increasing MWCNT has no significant effect on BET surface area.

TABLE 1

| BET surface area of ZrO$_2$ and MWCNT- ZrO$_2$ nanocomposites. | |
| --- | --- |
| Sample | BET surface area. M$^2$/g |
| ZrO$_2$ | 50.00 |
| 1 wt. % MWCNT-ZrO$_2$ | 53.50 |
| 2 wt. % MWCNT-ZrO$_2$ | 56.10 |
| 3 wt. % MWCNT-ZrO$_2$ | 59.20 |
| 4 wt. % MWCNT-ZrO$_2$ | 59.30 |
| 5 wt. % MWCNT-ZrO$_2$ | 59.50 |

Figure 3:
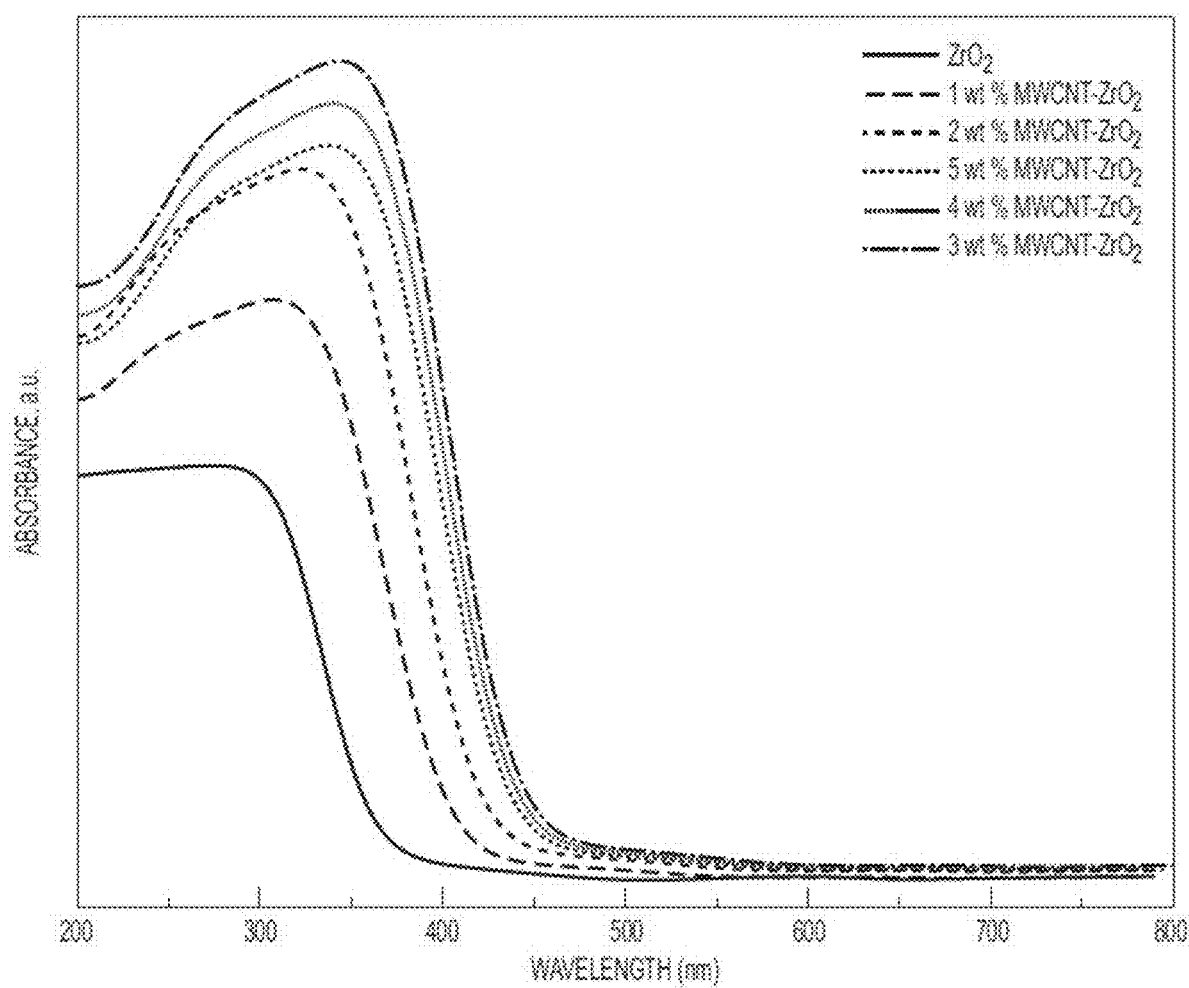
FIG. 3 UV-Vis spectra of ZrO$_2$, MWCNT-ZrO$_2$.

FIG. 3 shows the UV/vis spectra of MWCNT-ZrO$_2$. The results in FIG. 3 show a redshift of $\lambda_{max}$ as the amount of MWCNT in the nanocomposite increases. Also, the band gap narrows as the amount of MWCNT in the nanocomposite increases. For example the increase of the percentage of MWCNT from 0 to 3 wt. % decreases band gap energy of ZrO$_2$ from 3.32 to 2.67 eV. Above 3 wt. % increase the band gap narrowing is unnoticeable.

Figure 4:
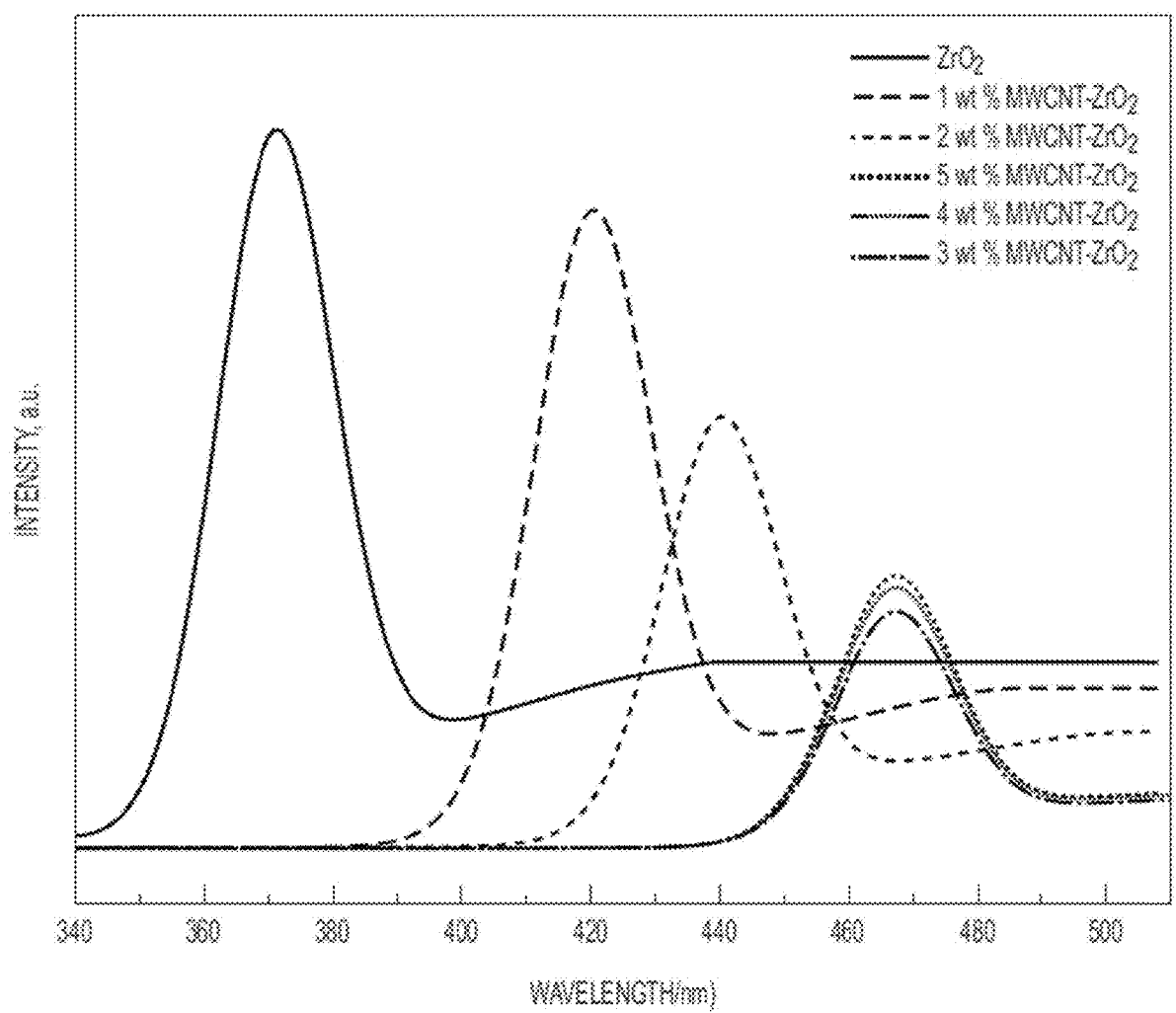
FIG. 4 PL spectra of ZrO$_2$, MWCNT-ZrO$_2$, and 1-5 wt. % MWCNT-ZrO$_2$ nanocomposites.

Photoluminescence emission spectra (PL) of ZrO$_2$ and 1-5 wt % MWCNT-ZrO$_2$ nanocomposites (FIG. 4) show the peak intensity decrease in the following order ZrO$_2$>1 wt % MWCNT-ZrO$_2$>2 wt % MWCNT-ZrO$_2$>5 wt % MWCNT-ZrO$_2$>4 wt % MWCNT-ZrO$_2$>3 wt % MWCNT-ZrO$_2$. The observed red shift is a result of the dispersion of ZrO$_2$ on the surface of MWCNT. The values of band gap energy of ZrO$_2$, 1 wt % MWCNT-ZrO$_2$, 2 wt % MWCNT-ZrO$_2$, 3 wt % MWCNT-ZrO$_2$, 4 wt % MWCNT-ZrO$_2$ and 5 wt % MWCNT-ZrO$_2$ are calculated from their PL emission spectra are 3.31±0.15, 2.94±0.15, 2.81.94±0.14, 2.66±0.13, 2.69±0.14 and 2.70 eV±0.14, respectively confirming data observed from the UV-Vis spectra.

Figure 5:
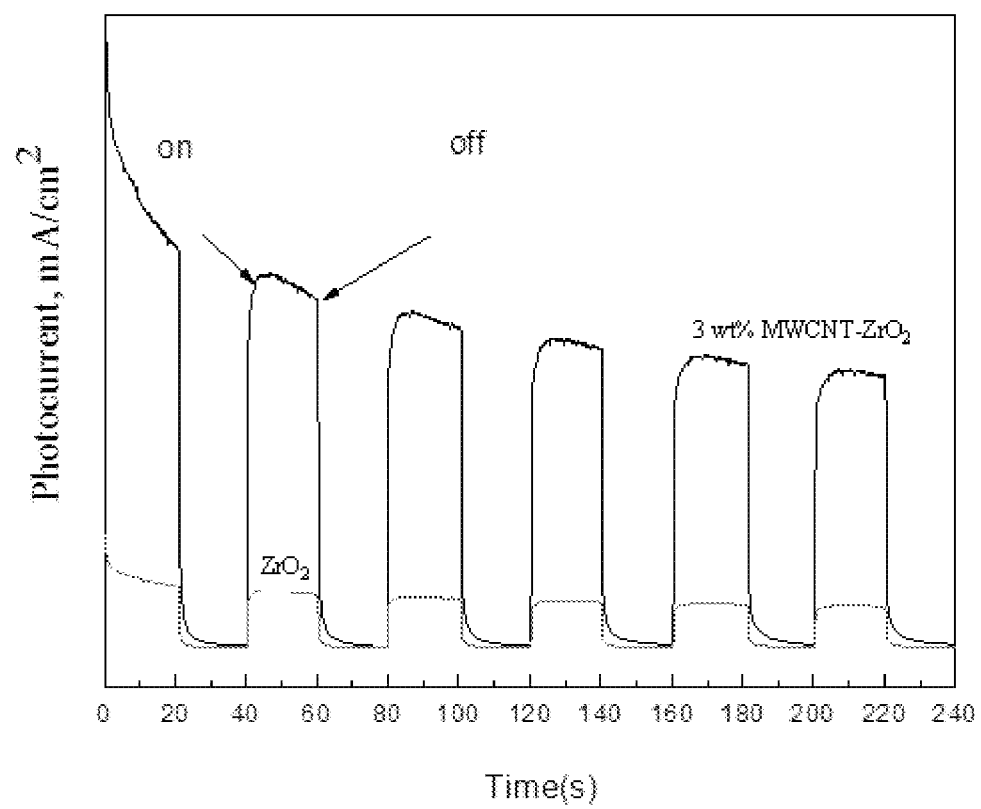
FIG. 5 Transient photocurrent responses of ZrO$_2$ and 3 wt. % MWCNT-ZrO$_2$ photocatalyst
FIG. 6 Effect of type of photocatalyst on amount of hydrogen evolution.

Transient photocurrent responses of $ZrO_2$ and 3 wt % MWCNT-$ZrO_2$ photocatalyst are shown in FIG. 5. The result shows that 3 wt % MWCNT-$ZrO_2$ has 7 times greater photocurrent density than that of $ZrO_2$ indicating that the rate of electron-hole recombination is very small for the 3 wt % MWCNT-$ZrO_2$ as compared to that of $ZrO_2$.

Figure 6:
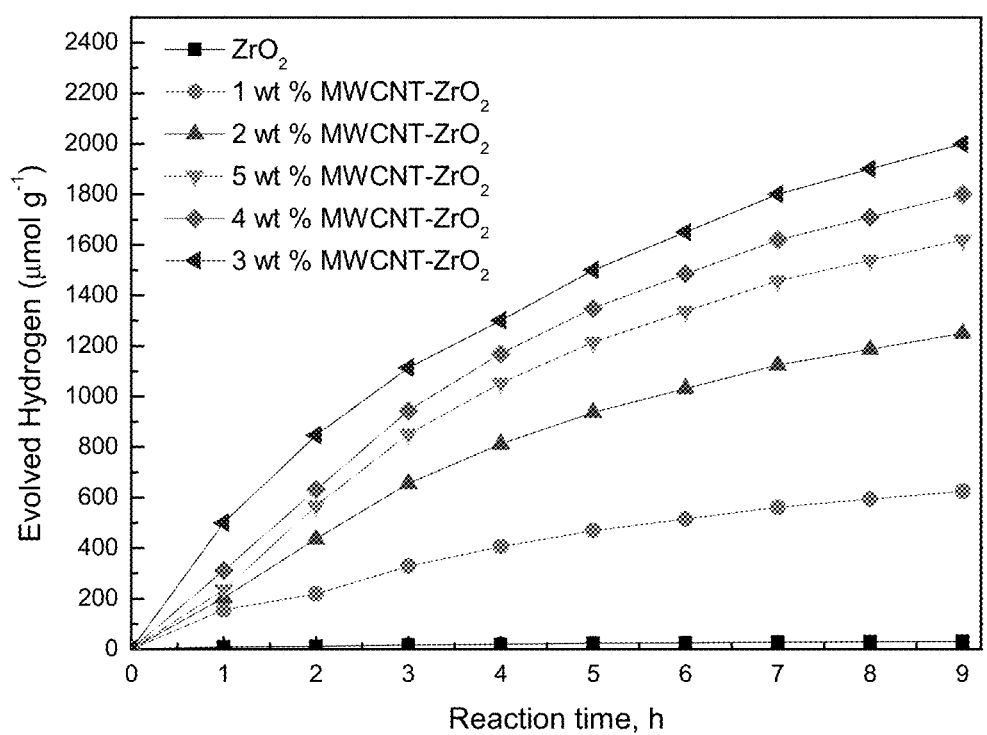
Figure 7:
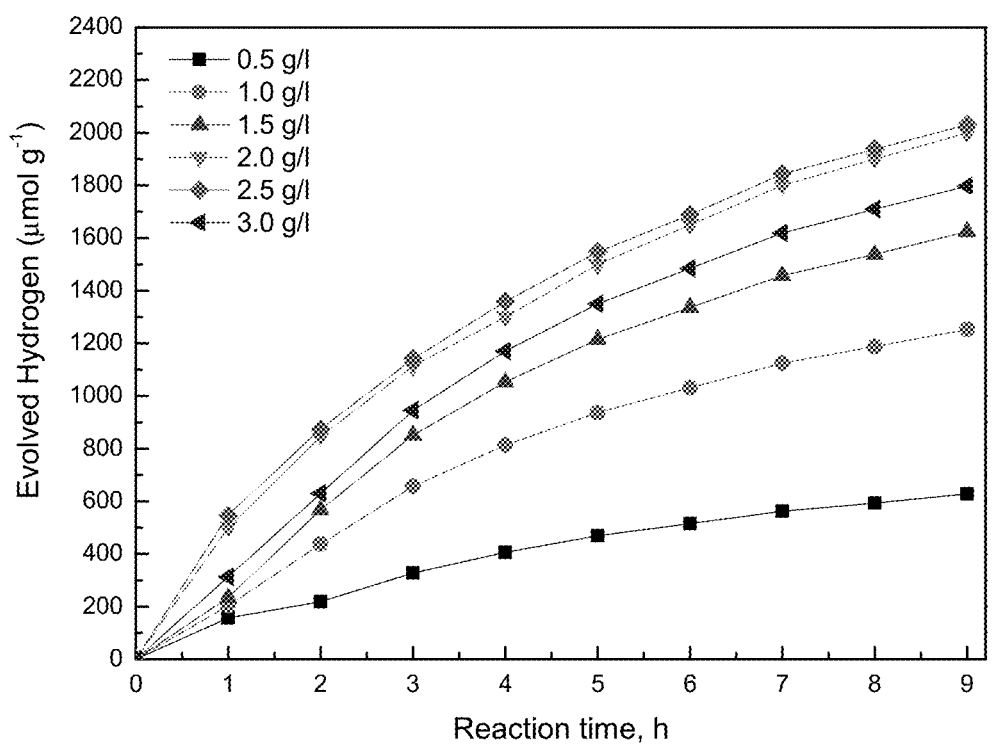
FIG. 7 Effect of 1, 2, 3, 4, 3, and 5 wt. % MWCNT-ZrO$_2$ photocatalyst on the amount of hydrogen evolution.

Performance of the Nanocomposite in the $H_2$ Evolution Experiment:

FIG. 6 shows time course for the hydrogen produced by the photochemical reactions catalyzed by 2 g/L of $ZrO_2$, 1 wt. % MWCNT-$ZrO_2$, 2 wt. % MWCNT-$ZrO_2$,' 3 wt. % MWCNT-$ZrO_2$, 4 wt. % MWCNT-$ZrO_2$, and 5 wt. % MWCNT-$ZrO_2$ of nanocomposites MWCNT-$ZrO_2$ using 500 W xenon lamp. As shown in FIG. 6, $ZrO_2$ has very little or no photocatalytic activity because $ZrO_2$ absorbs in the UV region and the reaction mixture is irradiated with visible light. The decrease in the band gap upon the addition of MWCNT to $ZrO_2$ leads to large increase in the catalytic efficiency of the zirconium catalyst. The hydrogen evolution for the photochemical reaction-catalysed by $ZrO_2$ is 31.2 µmol compared to 2000 µmol for that catalysed by 3 wt. % MWCNT-$ZrO_2$. FIG. 7 shows the time course for hydrogen evolution from the photochemical reaction-catalyzed by an amount of 3 wt. % MWCNT-$ZrO_2$ ranging from 0.5 g/L to 3.0 g/L. As expected, the amount of hydrogen evolved in the photochemical reaction is increased with increasing the amount of catalyst up to 2.0 g/L due to increase in number of available sites for the photocatalytic reaction. Above 2 g/L catalyst, the amount of hydrogen evolved decreases with increasing the amount of catalyst probably due to the increased amount of catalyst hinders the light penetration in the reaction mixture.

Figure 8:
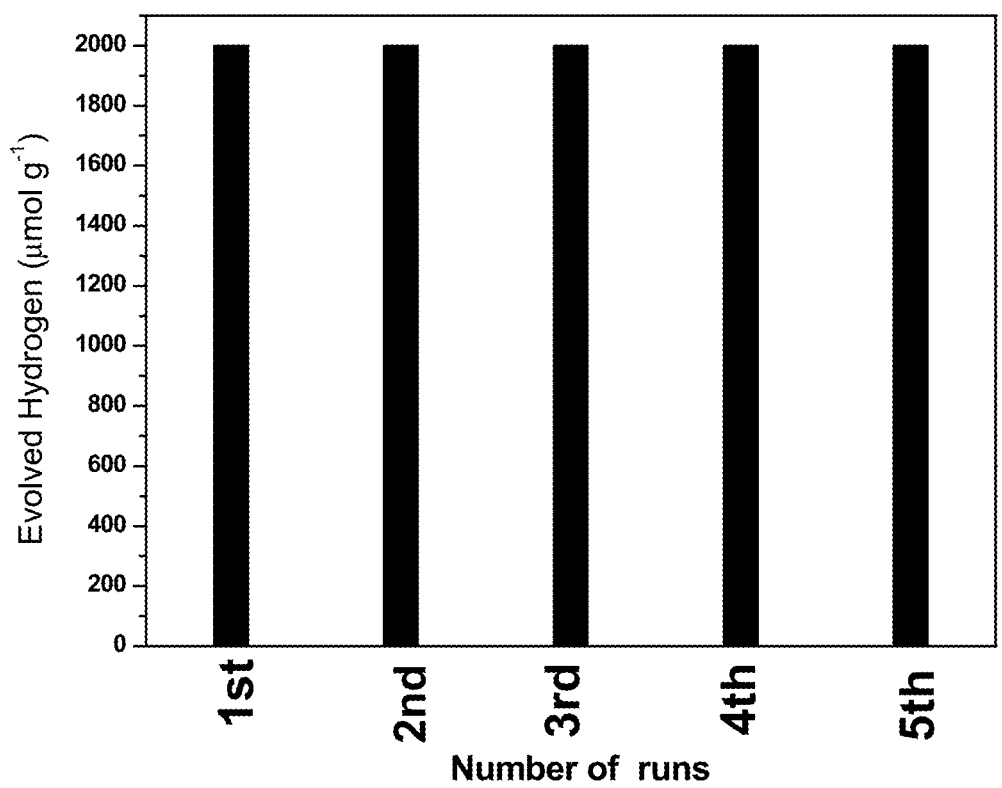
FIG. 8 Effect of recycling 3 wt. % MWCNT-ZrO$_2$ photocatalyst on the amount of hydrogen produced.

Recycling and reuse of 3 wt. % MWCNT-$ZrO_2$ photocatalyst on amount of hydrogen evaluation is examined using 2.0 g/L of 3 wt. % MWCNT-$ZrO_2$ photocatalyst in 450 mL aqueous solution irradiated with 500 W xenon lamp 9 h. FIG. 8 shows recycling and reusing of 3 wt. % MWCNT-$ZrO_2$ photocatalyst on amount of hydrogen evaluation. It is clear that 3 wt. % MWCNT-$ZrO_2$ photocatalyst has photocatalytic stability and can be used and recycled many times without significant loss of catalytic activity.

The present disclosure describes a method for the synthesis of $ZrO_2$ nanoparticles and MWCNT-$ZrO_2$ nanocomposites in the presence of a poloxamer template at room temperature. The photocatalytic activity of 3 wt. % MWCNT-$ZrO_2$ nanocomposites is significantly better photocatalyst than $ZrO_2$, 1 wt. % MWCNT-$ZrO_2$, 2 wt. % MWCNT-$ZrO_2$, 4 wt. % MWCNT-$ZrO_2$ and 5 wt. % MWCNT-$ZrO_2$ for hydrogen production by 64.1, 3.2, 1.6, 1.2 and 1.1 times, respectively. The photocatalyst 3 wt. % MWCNT-$ZrO_2$ displays photocatalytic stability and can be recycled in a method for the production of hydrogen from water.

The invention claimed is:

1. An alcohol-based method of making a $ZrO_2$-multi-walled carbon nanotube nanocomposite, comprising:
    dispersing, while sonicating, a zirconium alkoxide and a poloxamer in an alcohol to form a mixture, wherein the ratio of the zirconium alkoxide to the alcohol to the poloxamer is in the range of 0.2:10:0.1 to 3:10:0.5 (w/w/w),
    mixing a multi-walled carbon nanotube (MWCNT) with the mixture to form a MWCNT-containing mixture, and
    mixing an aqueous carboxylic acid solution with the MWCNT-containing mixture to precipitate the $ZrO_2$-multi-walled carbon nanotube nanocomposite precursor, then
    calcining the $ZrO_2$-multi-walled carbon nanotube nanocomposite precursor under nitrogen to form the $ZrO_2$-multi-walled carbon nanotube nanocomposite;
    wherein the $ZrO_2$-multi-walled carbon nanotube nanocomposite comprises 0.5%-5% by weight of the MWCNT.

2. The method of claim 1, wherein the zirconium alkoxide is zirconium isopropoxide and the alcohol is isopropyl alcohol.

3. The method of claim 1, wherein the carboxylic acid is acetic acid.

4. The method of claim 1, wherein the calcining is at about 300° C. under nitrogen.

* * * * *